US011948472B2

(12) United States Patent
Oonishi et al.

(10) Patent No.: US 11,948,472 B2
(45) Date of Patent: Apr. 2, 2024

(54) POPULARITY EVALUATION SYSTEM AND GEOGRAPHICAL FEATURE GENERATION MODEL

(71) Applicant: NTT DOCOMO, INC., Chiyoda-ku (JP)

(72) Inventors: Anna Oonishi, Chiyoda-ku (JP); Satoshi Kawasaki, Chiyoda-ku (JP); Yusuke Fukazawa, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 139 days.

(21) Appl. No.: 17/630,447

(22) PCT Filed: Jul. 22, 2020

(86) PCT No.: PCT/JP2020/028533
§ 371 (c)(1),
(2) Date: Jan. 26, 2022

(87) PCT Pub. No.: WO2021/020299
PCT Pub. Date: Feb. 4, 2021

(65) Prior Publication Data
US 2022/0254279 A1    Aug. 11, 2022

(30) Foreign Application Priority Data
Jul. 30, 2019    (JP) ................................ 2019-139532

(51) Int. Cl.
*G09B 29/00*    (2006.01)
*G06F 16/335*    (2019.01)
(Continued)

(52) U.S. Cl.
CPC ......... *G09B 29/006* (2013.01); *G06F 16/335* (2019.01); *G06F 16/56* (2019.01);
(Continued)

(58) Field of Classification Search
None
See application file for complete search history.

(56) References Cited

U.S. PATENT DOCUMENTS

2010/0312765 A1* 12/2010 Sorakado ................ G06F 16/51
707/E17.089
2016/0358190 A1* 12/2016 Terrazas .................. G06F 16/29

FOREIGN PATENT DOCUMENTS

JP    2013-93015 A    5/2013

OTHER PUBLICATIONS

International Preliminary Report on Patentability and Written Opinion dated Feb. 10, 2022 in PCT/JP2020/028533, 5 pages.

(Continued)

*Primary Examiner* — Kannan Shanmugasundaram
(74) *Attorney, Agent, or Firm* — Oblon, McClelland, Maier & Neustadt, L.L.P.

(57) ABSTRACT

A popularity estimation device includes: an acquisition unit configured to acquire a first map image including a first particular point and to acquire a plurality of second map images including a second particular point which is a particular point; a generation unit configured to generate a first feature vector and a second feature vector by inputting the first map image and the second map images to a geographical feature generation model with a map image as an input and with a feature vector indicating geographical features of the map image as an output; a score calculating unit configured to calculate a popularity score of the first particular point from a popularity score of the second particular point based on a degree of similarity between the first feature vector and the second feature vector; and an output unit configured to output the popularity score of the first particular point.

7 Claims, 11 Drawing Sheets

(51) Int. Cl.
  *G06F 16/56* (2019.01)
  *G06N 20/20* (2019.01)
  *G06Q 50/10* (2012.01)
(52) U.S. Cl.
  CPC ............. *G06N 20/20* (2019.01); *G06Q 50/10* (2013.01); *G06F 2216/03* (2013.01)

(56) References Cited

OTHER PUBLICATIONS

International Search Report dated Oct. 20, 2020 in PCT/JP2020/028533 filed on Jul. 22, 2020 (2 pages).

* cited by examiner

| POI NAME | POSITION INFORMATION | AVERAGE POPULATION (DAYTIME) | ... | DISTANCE TO NEAREST STATION | CATEGORY ID | PREFECTURAL CODE | ... | NUMBER OF NEARBY POIS | POPULARITY SCORE |
|---|---|---|---|---|---|---|---|---|---|
| poi11 | p11 | 325.5 | ... | 485 | 15 | 26 | ... | 13 | 32 |
| poi12 | p12 | 50.54 | ... | 1834 | 15 | 12 | ... | 330 | 56 |
| poi13 | p13 | 17.79 | ... | 788 | 15 | 20 | ... | 4 | 318 |
| ... | ... | ... | ... | ... | ... | ... | ... | ... | ... |

(b)

| POI NAME | POSITION INFORMATION | AVERAGE POPULATION (DAYTIME) | ... | DISTANCE TO NEAREST STATION | CATEGORY ID | PREFECTURAL CODE | ... | NUMBER OF NEARBY POIS | POPULARITY SCORE |
|---|---|---|---|---|---|---|---|---|---|
| poi21 | p21 | 210.61 | ... | 10528 | 15 | 3 | ... | 132 | n/a |
| poi22 | p22 | 17.61 | ... | 230 | 15 | 44 | ... | 24 | n/a |
| poi23 | p23 | 64.23 | ... | 655 | 15 | 31 | ... | 0 | n/a |
| ... | ... | ... | ... | ... | ... | ... | ... | ... | ... |

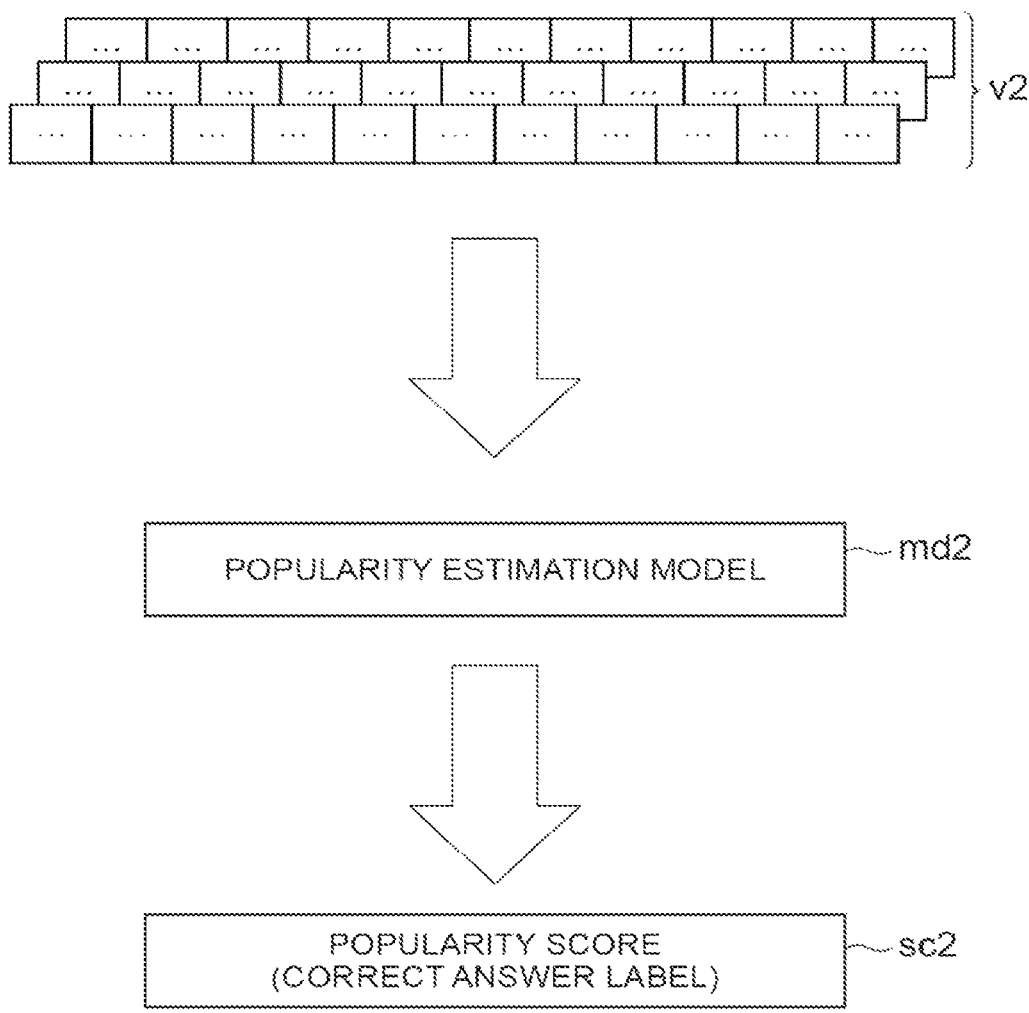

| POI NAME | POSITION INFORMATION | AVERAGE POPULATION (DAYTIME) | ... | DISTANCE TO NEAREST STATION | CATEGORY ID | PREFECTURAL CODE | ... | NUMBER OF NEARBY POIS | POPULARITY SCORE |
|---|---|---|---|---|---|---|---|---|---|
| STORE A C1 SHOP | p31 | 250.1 | ... | 250 | 21 | 28 | ... | 14 | 32 |
| STORE A C2 SHOP | p32 | 48.2 | ... | 1400 | 21 | 14 | ... | 330 | 56 |
| STORE A C3 SHOP | p33 | 18.2 | ... | 621 | 21 | 16 | ... | 10 | 318 |
| ... | ... | ... | ... | ... | ... | ... | ... | ... | ... |

(b)

| POI NAME | POSITION INFORMATION | AVERAGE POPULATION (DAYTIME) | ... | DISTANCE TO NEAREST STATION | CATEGORY ID | PREFECTURAL CODE | ... | NUMBER OF NEARBY POIS | POPULARITY SCORE |
|---|---|---|---|---|---|---|---|---|---|
| STORE B D1 SHOP | p41 | 208.3 | ... | 8310 | 21 | 2 | ... | 120 | 500 |
| STORE B D2 SHOP | p42 | 19.4 | ... | 280 | 21 | 45 | ... | 21 | 50 |
| STORE B D3 SHOP | p43 | 61.2 | ... | 703 | 21 | 28 | ... | 0 | 100 |
| ... | ... | ... | ... | ... | ... | ... | ... | ... | ... |

Fig.9
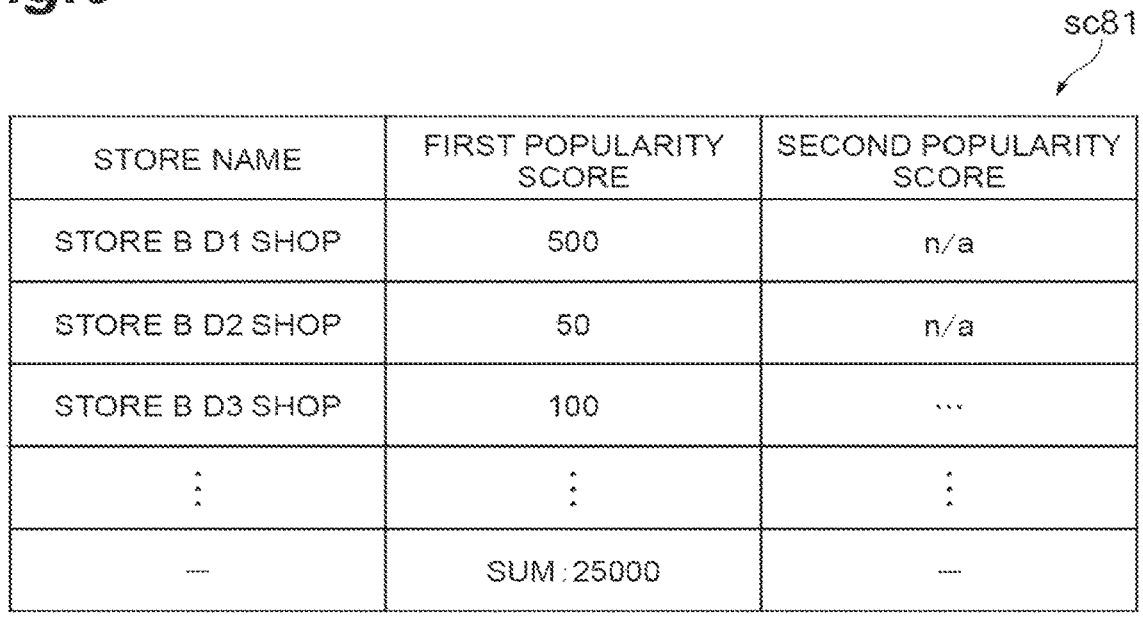
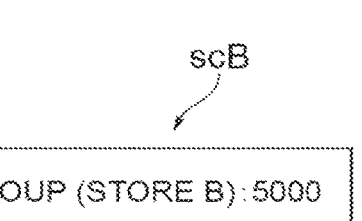
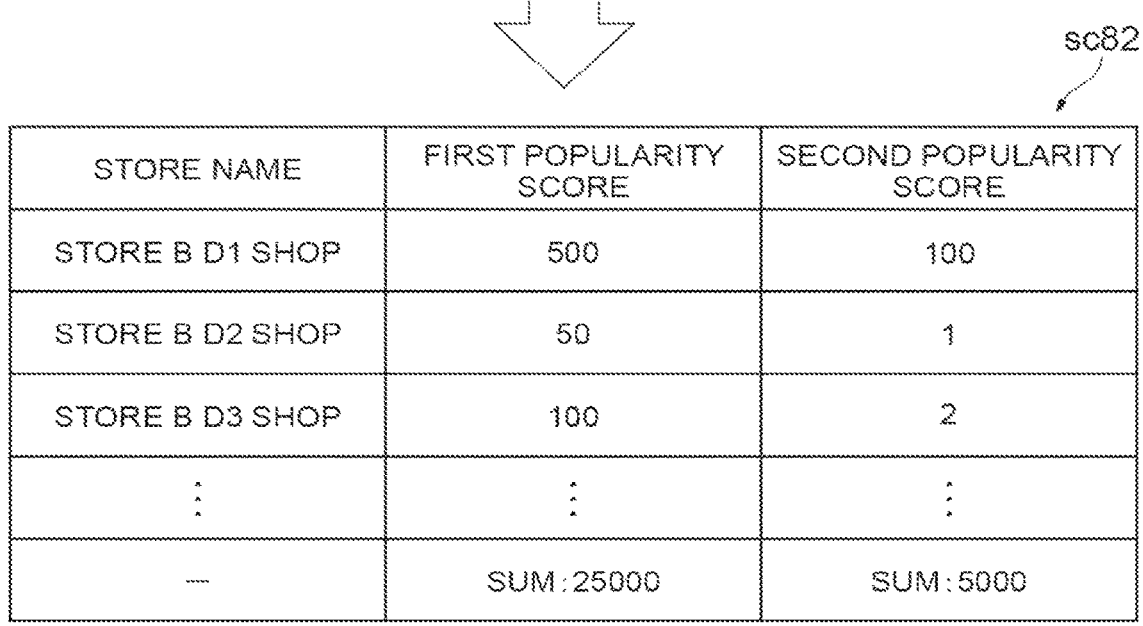

POPULARITY EVALUATION SYSTEM AND GEOGRAPHICAL FEATURE GENERATION MODEL

TECHNICAL FIELD

The present invention relates to a popularity estimation system and a geographical feature generation model.

BACKGROUND ART

In retrieving information on a facility referred to as a point of interest (POI) indicating a particular point, for example, facility information with a facility name matching an input keyword is ranked from the highest score and is output and displayed. For example, in order to appropriately retrieve a complex facility including a plurality of facilities and different facilities with the same name, for example, popularity scores in which popularity rankings of the facilities are appropriately reflected are used to rank results of retrieval. A popularity score is generated, for example, based on a number of mentions in a social network service (SNS) or the like. In retrieving facility information, a technique of acquiring a browsing history of a website of a restaurant and a movement histories of users based on GPS and generating a recommended restaurant list for a user using a preference score which is calculated based on a degree of separation therebetween is known (for example, see Patent Literature 1).

CITATION LIST

Patent Literature

[Patent Literature 1] Japanese Unexamined Patent Publication No. 2013-93015

SUMMARY OF INVENTION

Technical Problem

When a popularity score is generated based on a number of mentions in an SNS or the like, the popularity score is calculated based on a current history of the SNS or the like. However, there may be a facility to which a high score should be given even when it is not mentioned in an SNS or the like. For example, when a new facility has no history of being mentioned in an SNS or the like or a history being little mentioned, an appropriate popularity score is not given to the new facility.

Therefore, the present invention was made in consideration of the aforementioned problems and an objective thereof is to estimate and give an appropriate popularity score for a POI to which a popularity score has not been given.

Solution to Problem

In order to achieve the aforementioned objective, a popularity estimation system according to an aspect of the present invention is a popularity estimation system that estimates popularity of a particular point which is geographically identified, the popularity estimation system including: an acquisition unit configured to acquire a first map image including a first particular point which is a particular point to be estimated and to acquire a plurality of second map images including a second particular point which is a particular point of which a popularity score indicating popularity is known; a generation unit configured to generate a first feature vector and a second feature vector indicating geographical features of the first map image and the second map images by inputting the first map image and the second map images to a geographical feature generation model which has been trained by machine learning with a map image as an input and with a feature vector indicating geographical features of the map image as an output; a score calculating unit configured to calculate a popularity score of the first particular point from a popularity score of the second particular point based on a degree of similarity between the first feature vector and the second feature vector; and an output unit configured to output the calculated popularity score of the first particular point.

According to the aspect, the first feature vector is acquired by inputting the first map image including the first particular point to the geographical feature generation model. The first feature vector indicates geographical features of the first particular point. The second feature vector is acquired by inputting the second map image including the second particular point of which the popularity score is known to the geographical feature generation model. The second feature vector indicates geographical features of the second particular point. Since the popularity score of the first particular point is calculated from the known popularity score of the second particular point based on the degree of similarity between the first feature vector and the second feature vector, it is possible to obtain the popularity score of the first particular point in which geographical similarity to the second particular point is appropriately reflected.

Advantageous Effects of Invention

It is possible to give an appropriate popularity score to a POI to which a popularity score has not been given.

BRIEF DESCRIPTION OF DRAWINGS

FIG. 3($a$) is a diagram illustrating an example of POI information including attribute information of POIs of which a popularity score is known and FIG. 3($b$) is a diagram illustrating an example of POI information of POIs of which a popularity score is not known and of which a popularity score is to be estimated.

FIG. 7 is a diagram illustrating a learning process of a popularity estimation model.

FIG. 8($a$) is a diagram illustrating an example of POI information including attribute information of POIs which belong to a particular group and of which a popularity score is known and FIG. 8($b$) is a diagram illustrating an example of POI information of POIs which belong to a particular group, of which a popularity score is not known, and of which a popularity score is to be estimated.

FIG. 9 is a diagram illustrating an example in which a second popularity score of a POI which belongs to a particular group and of which a popularity score is unknown is calculated based on a first popularity score.

DESCRIPTION OF EMBODIMENTS

Hereinafter, a popularity estimation device according to an embodiment of the present invention will be described with reference to the accompanying drawings. In some cases, the same elements will be referred to by the same reference signs and repeated description thereof will be omitted.

Figure 1:
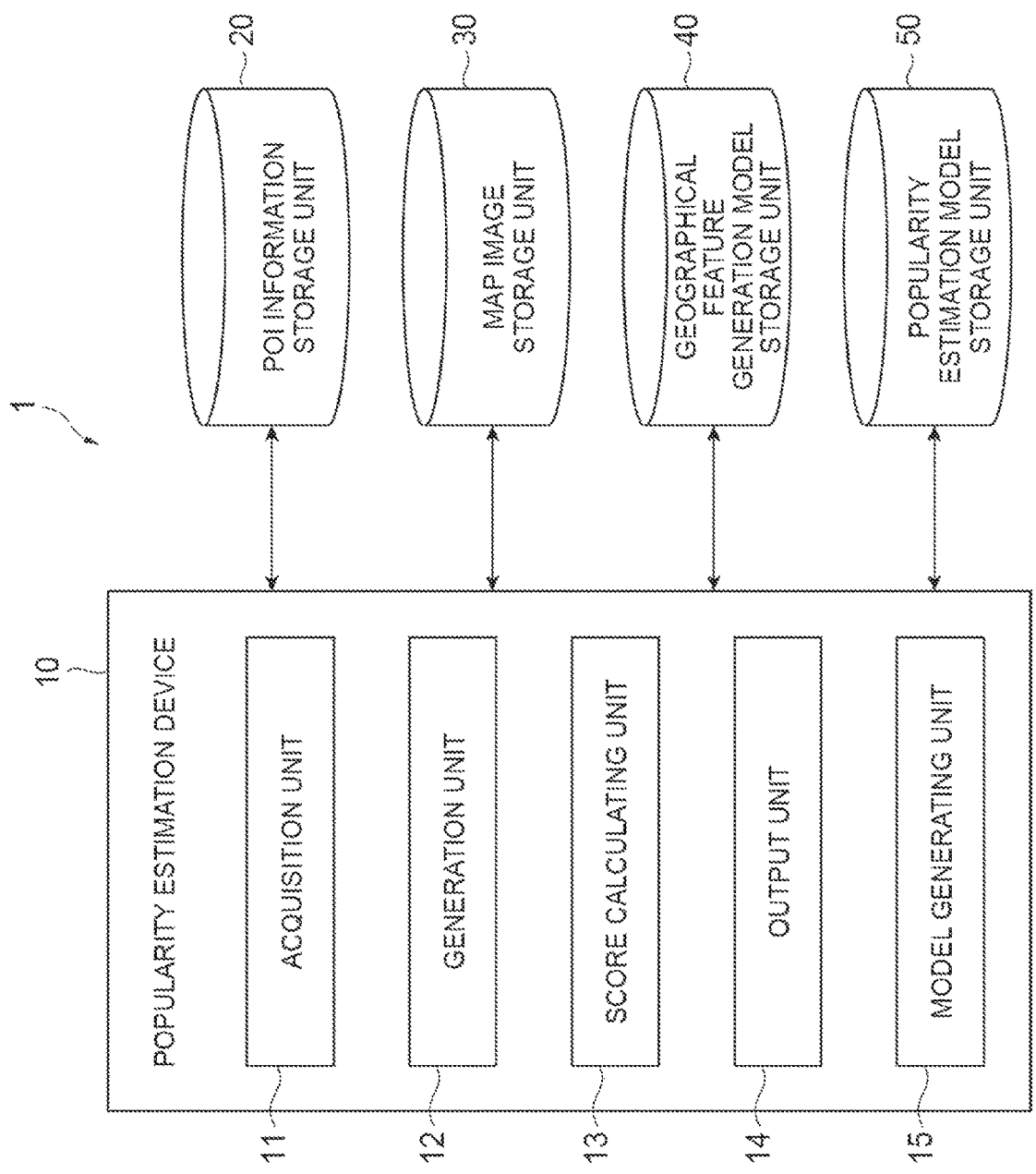
FIG. 1 is a block diagram illustrating a functional configuration of a popularity estimation system including a popularity estimation device according to an embodiment.

FIG. 1 is a block diagram illustrating a functional configuration of a popularity estimation system including a popularity estimation device according to an embodiment. As illustrated in FIG. 1, a popularity estimation system 1 includes a popularity estimation device 10, a POI information storage unit 20, a map image storage unit 30, a geographical feature generation model storage unit 40, and a popularity estimation model storage unit 50.

The popularity estimation device 10 is a device that estimates popularity of a particular point which is geographically identified. The particular point is, for example, information on a facility called a POI. A popularity score indicating popularity is used to retrieve a POI. That is, in retrieving a POI, for example, POIs having a name or the like matching an input keyword are ranked from the highest popularity score and are output and displayed. Popularity scores are referred to in the ranking.

Functional units 11 to 15 included in the popularity estimation device 10 are configured to access various storage units 20, 30, 40, and 50. The popularity estimation device 10 and the various storage units 20, 30, 40, and 50 may be configured as a single device or may be configured as different devices.

As illustrated in FIG. 1, the popularity estimation device 10 functionally includes an acquisition unit 11, a generation unit 12, a score calculating unit 13, an output unit 14, and a model generating unit 15. These functional units 11 to 15 may be configured as a single device or may be divisionally configured as a plurality of devices.

The block diagram illustrated in FIG. 1 shows blocks of functional units. These functional blocks (constituent units) are realized by an arbitrary combination of at least one of hardware and software. The realization method of each functional block is not particularly limited. That is, each functional block may be realized by a single device which is physically or logically coupled, or may be realized by two or more devices which are physically or logically separated and which are directly or indirectly connected (for example, in a wired or wireless manner). Each functional block may be realized by combining software with the single device or the two or more devices.

The functions include determining, deciding, judging, calculating, computing, processing, deriving, investigating, searching, ascertaining, receiving, transmitting, outputting, accessing, resolving, selecting, choosing, establishing, comparing, supposing, expecting, considering, broadcasting, notifying, communicating, forwarding, configuring, reconfiguring, allocating, mapping, and assigning, but are not limited thereto. For example, a functional block (constituent unit) for transmitting is referred to as a transmitting unit or a transmitter. As described above, the realization method of each function is not particularly limited.

Figure 2:
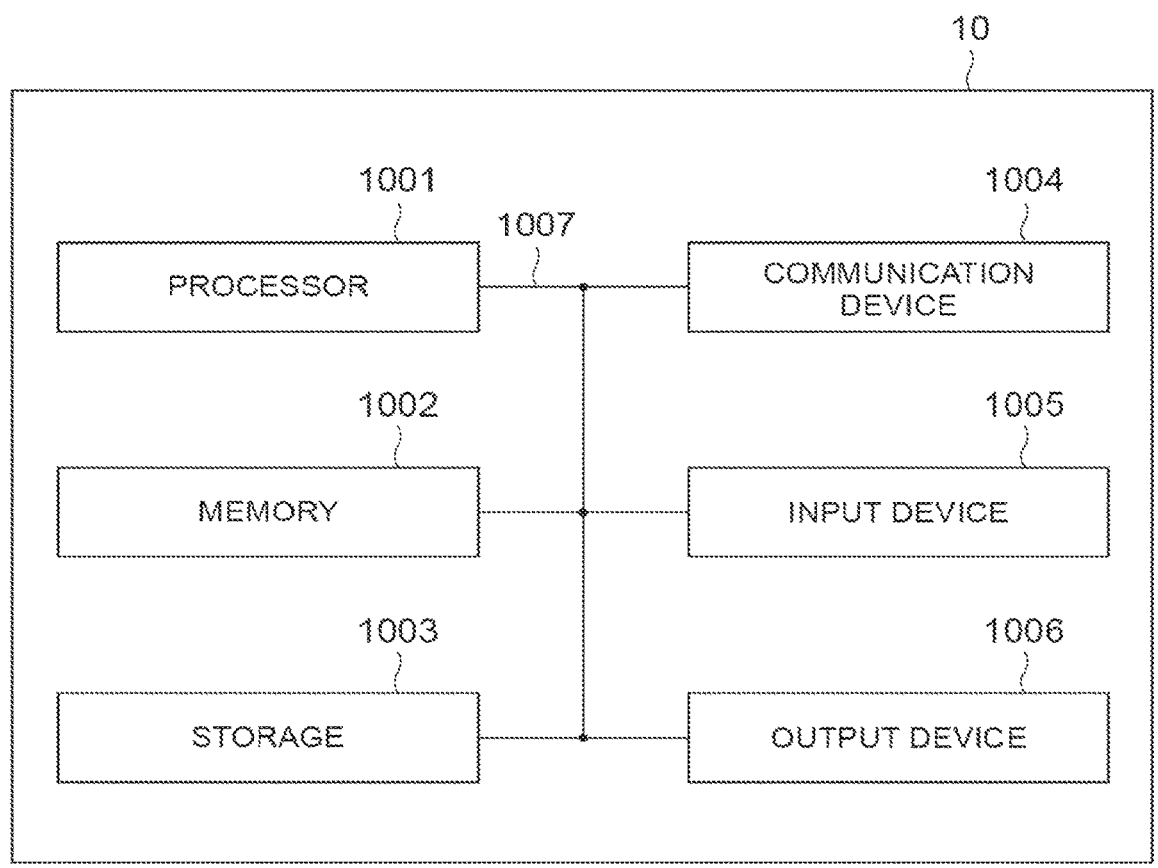
FIG. 2 is a block diagram illustrating a hardware configuration of the popularity estimation device.

For example, the popularity estimation device 10 according to an embodiment of the present invention may serve as a computer. FIG. 2 is a diagram illustrating an example of a hardware configuration of the popularity estimation device 10 according to an embodiment of the present disclosure. The popularity estimation device 10 may be physically configured as a computer device including a processor 1001, a memory 1002, a storage 1003, a communication device 1004, an input device 1005, an output device 1006, and a bus 1007.

In the following description, the term "device" can be replaced with circuit, device, unit, or the like. The hardware configuration of the popularity estimation device 10 may be configured to include one or more devices illustrated in the drawing or may be configured not to include some of the devices.

The functions of the popularity estimation device 10 can be realized by reading predetermined software (program) to hardware such as the processor 1001 and the memory 1002 and causing the processor 1001 to execute arithmetic operations and to control communication using the communication device 1004 or to control reading and/or writing of data with respect to the memory 1002 and the storage 1003.

The processor 1001 controls a computer as a whole, for example, by causing an operating system to operate. The processor 1001 may be configured as a central processing unit (CPU) including an interface with peripherals, a controller, an arithmetic operation unit, and a register. For example, the functional units 11 to 16 illustrated in FIG. 1 may be realized by the processor 1001.

The processor 1001 reads a program (a program code), a software module, data, or the like from at least one of the storage 1003 and the communication device 1004 to the memory 1002 and performs various processes in accordance therewith. As the program, a program that causes a computer to perform at least some of the operations described in the above-mentioned embodiment is used. For example, the functional units 11 to 15 of the popularity estimation device 10 may be realized by a control program which is stored in the memory 1002 and which operates in the processor 1001. The various processes described above are described as being performed by a single processor 1001, but they may be simultaneously or sequentially performed by two or more processors 1001. The processor 1001 may be mounted as one or more chips. The program may be transmitted from a network via an electrical telecommunication line.

The memory 1002 is a computer-readable recording medium and may be constituted by, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store a program (a program code), a software module, and the like that can be executed to perform a popularity estimation method according to an embodiment of the present invention.

The storage 1003 is a computer-readable recording medium and may be constituted by, for example, at least one of an optical disc such as a compact disc ROM (CD-ROM), a hard disk drive, a flexible disk, a magneto-optical disc (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may be referred to as an auxiliary storage device. The storage medium may be, for example, a database, a server, or another appropriate medium including at least one of the memory 1002 and the storage 1003.

The communication device 1004 is hardware (a transmitting and receiving device) that performs communication between computers via a wired network and/or a wireless network and is also referred to as, for example, a network device, a network controller, a network card, or a communication module.

The input device 1005 is an input device that receives an input from the outside (for example, a keyboard, a mouse, a microphone, a switch, a button, or a sensor). The output device 1006 is an output device that performs an output to the outside (for example, a display, a speaker, or an LED lamp). The input device 1005 and the output device 1006 may be configured as a unified body (for example, a touch panel).

The devices such as the processor 1001 and the memory 1002 are connected to each other via the bus 1007 for transmission of information. The bus 1007 may be constituted by a single bus or may be constituted by buses which are different depending on the devices.

The popularity estimation device 10 may be configured to include hardware such as a microprocessor, a digital signal processor (DSP), an application-specific integrated circuit (ASIC), a programmable logic device (PLD), or a field-programmable gate array (FPGA), and some or all of the functional blocks may be realized by the hardware. For example, the processor 1001 may be mounted as at least one piece of hardware.

The functional units of the popularity estimation device 10 will be described below. The acquisition unit 11 acquires a first map image including a first POI which is a POI of which popularity is to be estimated (a particular point). The acquisition unit 11 acquires a plurality of second map images including second POIs which are POIs of which a popularity score indicating popularity is known. Specifically, the acquisition unit 11 acquires a map image including a POI based on position information of the POI.

FIG. 3 is a diagram illustrating an example of a configuration of POI information stored in the POI information storage unit 20 and data included therein. FIG. 3(*a*) illustrates an example of POI information of a POI of which a popularity score is known. FIG. 3(*b*) illustrates an example of POI information of a POI of which a popularity score is not known and of which a popularity score is to be estimated. As illustrated in FIGS. 3(*a*) and 3(*b*), POI information includes position information, average population (daytime population), a distance to a nearest station, a category ID, a prefectural code, the number of nearby POIs, and a popularity score which are correlated with each POI name for identifying the corresponding POI.

The position information includes, for example, information of latitude and longitude. The average population is, for example, daytime population in a predetermined area centered on a position indicated by the position information (for example, an area with a square of several hundred meters or an area with a radius of several hundred meters) and is acquired, for example, based on serving information of a mobile terminal. The category ID identifies a type to which a facility indicated by the corresponding POI belongs. The prefectural code identifies a prefecture to which the corresponding POI belongs. The number of nearby POIs is the number of facilities in a predetermined category included in the predetermined area centered on the position indicated by the position information.

The popularity score is a score indicating popularity of the corresponding POI. The popularity score is generated, for example, based on a number of mentions in an SNS or the like. POIs illustrated in FIG. 3(*b*) have no history of being mentioned in an SNS or the like, for example, because the POIs are newly provided and popularity scores thereof are not known.

The map image storage unit 30 is constituted by a storage device that stores a map image. The acquisition unit 11 acquires a map image with reference to the map image storage unit 30 based on position information. The map image is, for example, an image of a map of an area with a square of 250 m or a square of 500 m centered on the position indicated by the position information. The size of an area of the map image is not limited to the illustrated size.

The map image may be constituted by a plurality of layers. That is, the map image may include a plurality of layers such as terrain information, genre information, and a road map associated with the area.

The generation unit 12 inputs the map image to a trained geographical feature generation model and generates a feature vector indicating geographical features of the map image. The geographical feature generation model is a model that is constructed by machine learning with a map image as an input and with a feature vector indicating geographical features of the map image as an output.

Figure 4:
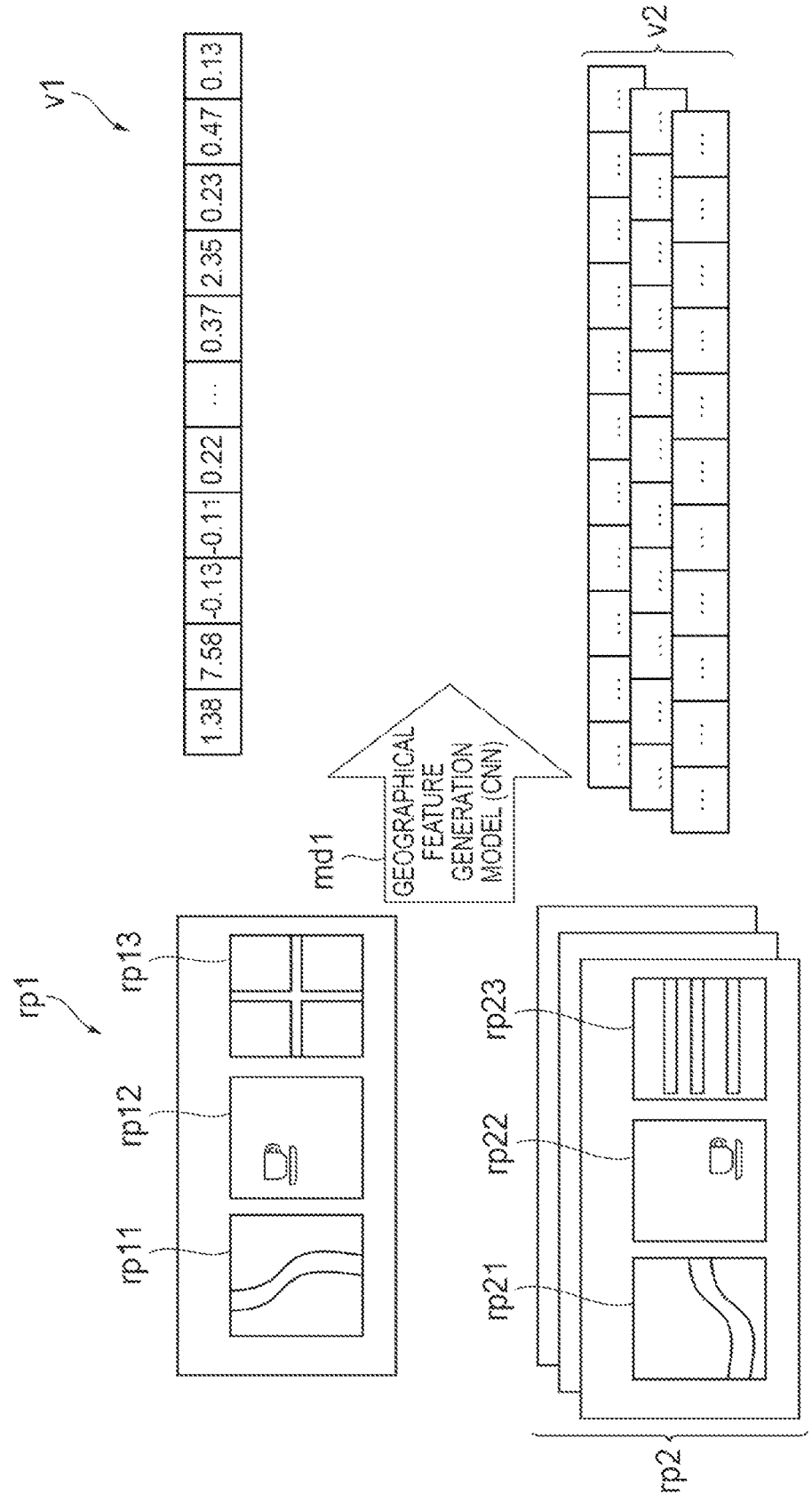
FIG. 4 is a diagram schematically illustrating an example in which a feature vector indicating geographical features of a POI is generated.

FIG. 4 is a diagram schematically illustrating an example in which a feature vector indicating geographical features of a POI is generated. As illustrated in FIG. 4, the acquisition unit 11 acquires a first map image rp1 including a first POI from the map image storage unit 30. For example, the first map image rp1 includes a plurality of layers such as terrain information rp11, genre information rp12, and a road map rp13. The acquisition unit 11 acquires a second map image rp2 including a second POI from the map image storage unit 30. For example, the second map image rp2 includes a plurality of layers such as terrain information rp21, genre information rp22, and a road map rp23.

A geographical feature generation model md1 is a model including a neural network. The geographical feature generation model md1 in this embodiment includes a convolutional neural network (CNN).

The generation unit 12 generates a first feature vector v1 by inputting the first map image rp1 to the geographical feature generation model md1. The first feature vector v1 is a distributed expression of the first map image rp1 and represents geographical features of the first POI.

The generation unit 12 generates a second feature vector v2 which is a distributed expression of each second map image rp2 by inputting a plurality of second map images rp2 to the geographical feature generation model md1.

Figure 5:
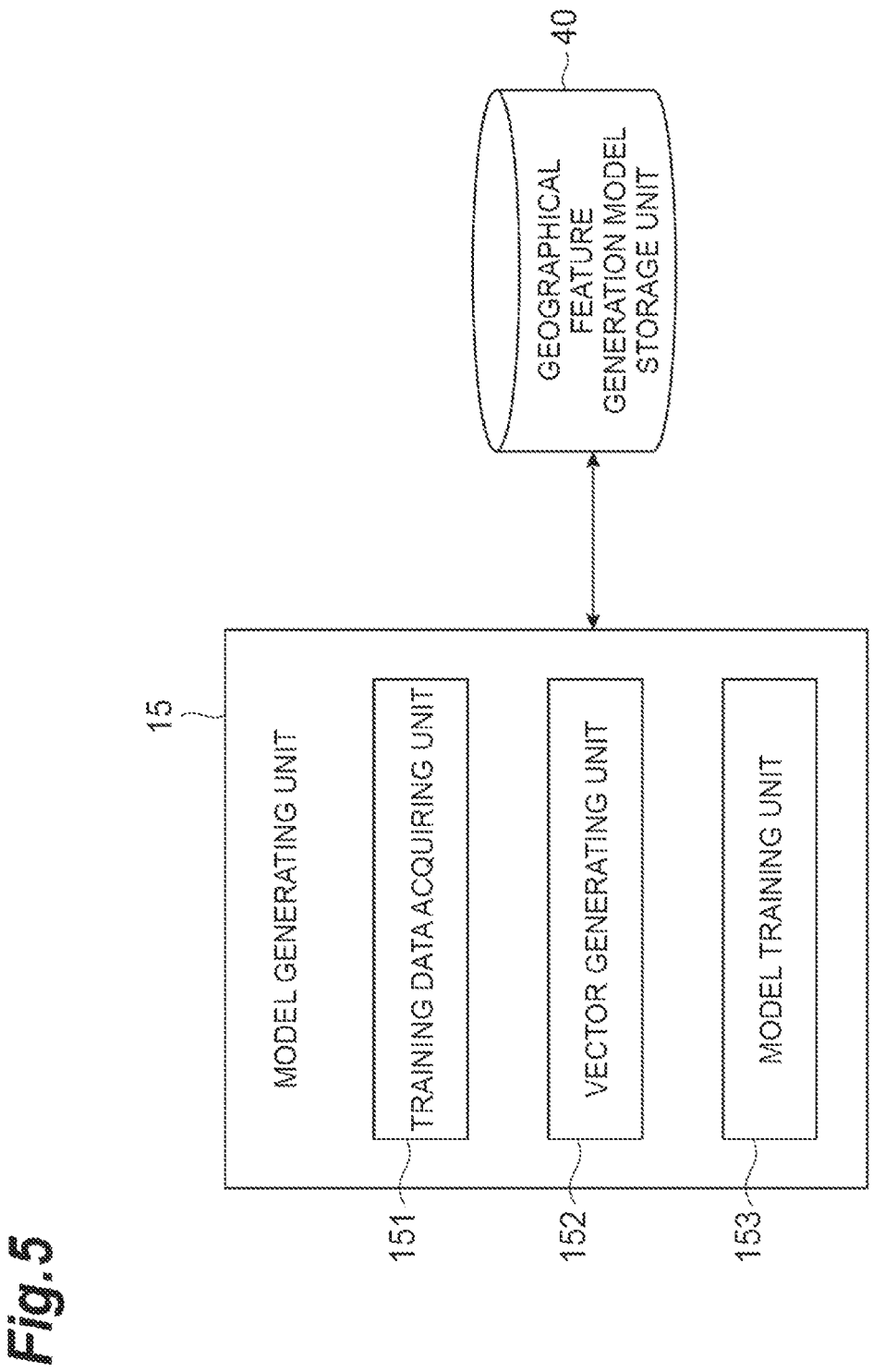
FIG. 5 is a diagram illustrating a functional configuration of a model generating unit.
Figure 6:
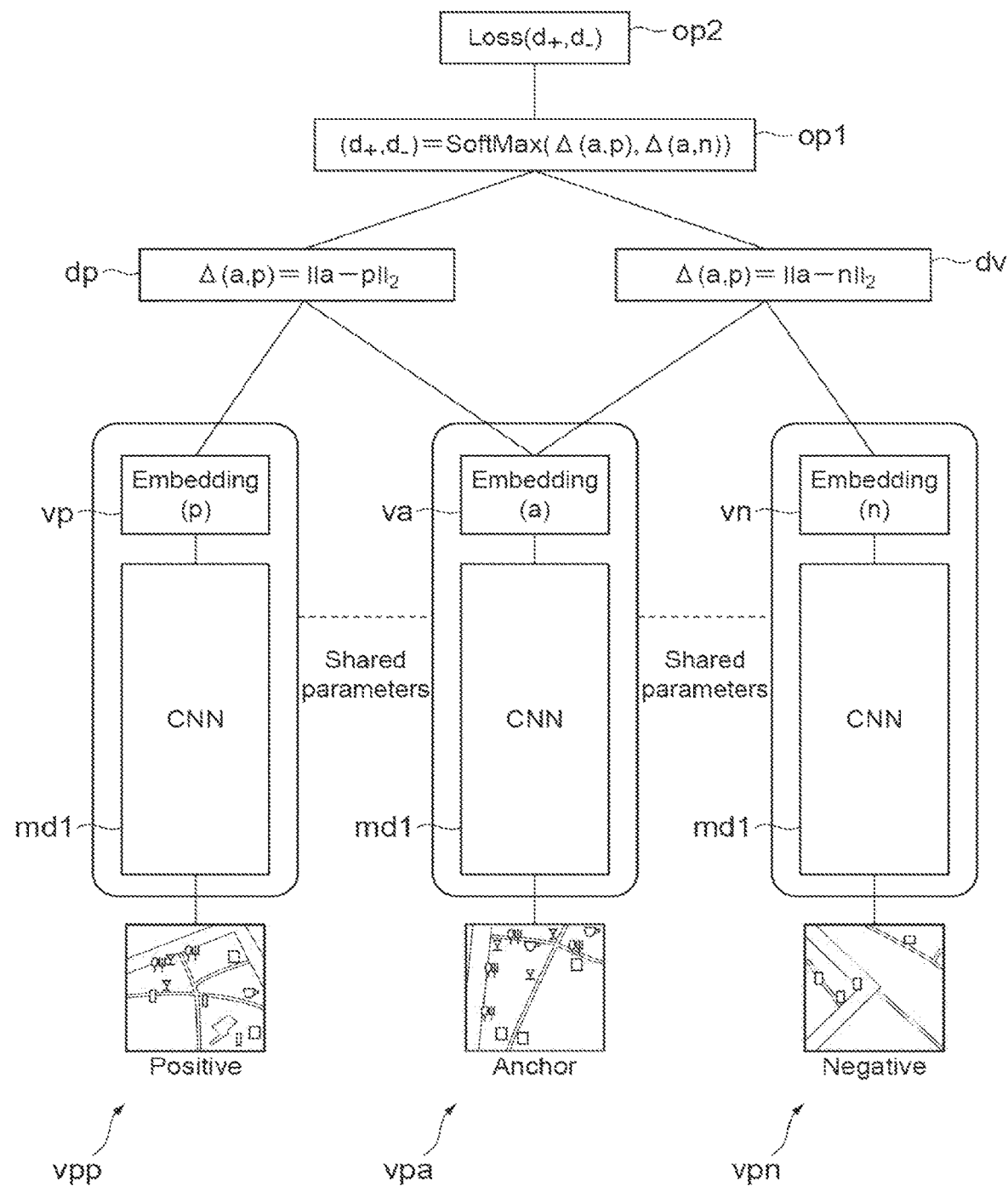
FIG. 6 is a diagram illustrating a learning process of a geographical feature generation model.

Generation of the geographical feature generation model md1 will be described now. The model generating unit 15 generates the geographical feature generation model md1 by machine learning. FIG. 5 is a diagram illustrating a functional configuration of the model generating unit 15. FIG. 6 is a diagram illustrating a process of training the geographical feature generation model md1. As illustrated in FIG. 5, the model generating unit 15 includes a training data acquiring unit 151, a vector generating unit 152, and a model training unit 153.

The training data acquiring unit 151 acquires anchor training data rpa, positive-example training data rpp, and negative-example training data rpn which are provided for training the geographical feature generation model md1 as a set of training data.

The anchor training data rpa includes a map image of a first area serving as an anchor of a set of training data. The training data acquiring unit 151 can acquire the map image of the first area as the anchor training data rpa from the map image storage unit 30.

The positive-example training data rpp includes a map image of a second area. In order to constitute training data which is a positive example, the geographical features of the second area need to be close to the geographical features of the first area. Accordingly, the map image of the second area may be obtained by rotating the map image of the first area.

The negative-example training data rpn includes a map image of a third area. In order to constitute training data which is a negative example, the third area is randomly set regardless of the first area.

The training data acquiring unit 151 acquires the map images of the first area, the second area, and the third area as the anchor training data rpa, the positive-example training data rpp, and the negative-example training data rpn from the map image storage unit 30. Various attribute values for each area may be correlated with the corresponding map image. Specifically, daytime population for each area, the number of facilities (the number of POIs) for each category, and the like may be correlated with the corresponding map image. Accordingly, the training data acquiring unit 151 can acquire various attribute values correlated with the first area, the second area, and the third area along with the anchor training data rpa, the positive-example training data rpp, and the negative-example training data rpn.

The training data acquiring unit 151 can extract the number of POIs belonging to each category for each of the first area, the second area, and the third area based on the category ID and the position information with reference to the POI information storage unit 20. Then, the training data acquiring unit 151 can add the extracted number of POIs as an attribute value for the corresponding area to the anchor training data rpa, the positive-example training data rpp, and the negative-example training data rpn.

Since the attribute value for each geographical area can be acquired as described above, the training data acquiring unit 151 may acquire a map image of the second area with an attribute value of which a difference from a predetermined attribute value for the first area is equal to or less than a predetermined value as the positive-example training data rpp. The training data acquiring unit 151 may acquire a map image of the third area with an attribute value of which a difference from the predetermined attribute value for the first area is greater than the predetermined value as the negative-example training data rpn.

The vector generating unit 152 inputs the anchor training data rpa, the positive-example training data rpp, and the negative-example training data rpn to the geographical feature generation model md1 and generates an anchor feature vector va, a positive-example feature vector vp, and a negative-example feature vector vn. That is, the anchor feature vector va, the positive-example feature vector vp, and the negative-example feature vector vn are distributed expressions of the anchor training data rpa, the positive-example training data rpp, and the negative-example training data rpn. As illustrated in FIG. 6, the geographical feature generation models md1 to which the anchor training data rpa, the positive-example training data rpp, and the negative-example training data rpn are input share parameters.

The model training unit 153 adjusts parameters of a neural network (CNN) which is included in the geographical feature generation model md1 such that a difference between the anchor feature vector va and the positive-example feature vector vp approaches zero and a difference between the anchor feature vector va and the negative-example feature vector vn increases.

Specifically, the model training unit 153 defines a distance dp between the anchor feature vector va and the positive-example feature vector vp as $\Delta(a, p)=\|a-p\|_2$, and a distance dn between the anchor feature vector va and the negative-example feature vector vn as $\Delta(a, n)=\|a-n\|_2$. The distance dp and the distance dn may be Euclidean distances.

Then, the model training unit 153 updates the parameters of the neural network (CNN) included in the geographical feature generation model md1 such that the distance dp approaches zero and the distance dn increases. That is, the model training unit 153 defines the parameters as $(d_+, d_-)=\text{SoftMax}(\Delta(a, p), \Delta(a, n))$ as indicated by reference sign op1 and updates (learns) the parameters of the CNN by machine learning such that a loss function $\text{Loss}(d_+, d_-)$ indicated by reference sign op2 approaches zero.

The generation unit 12 generates a feature vector which is a distributed expression of a map image of a predetermined area including a POI using the geographical feature generation model md1 generated in this way by the model generating unit 15.

Referring back to FIG. 1, the score calculating unit 13 calculates the popularity score of the first POI from the popularity score of the second POI based on a degree of similarity between the first feature vector indicating the geometrical features of the first POI and the second feature vector indicating the geometrical features of the second POI.

Specifically, the score calculating unit 13 calculates the popularity score of the first POI from the popularity score of the second POI based on the Euclidean distance between the first feature vector and the second feature vector.

More specifically, the score calculating unit 13 extracts a predetermined number of second POIs from the first in the order in which the Euclidean distance between the second feature vector for each second POI and the first feature vector increases out of a plurality of second POIs. Then, the score calculating unit 13 calculates the popularity score of the first PO1 based on the popularity scores of the extracted second POIs and the Euclidean distances from the first POI. For example, the score calculating unit 13 may acquire the popularity score of the first POI by calculating a weighted average of the popularity scores of the extracted second POIs through weighting based on the Euclidean distances from the first POI.

Since geographical similarity between POIs is reflected in an Euclidean distance between feature vectors, it is possible to estimate the popularity score of the first POI in which geographical similarity to the second POIs is appropriately reflected by calculating the popularity score of the first POI in this way. By using the popularity scores of a predetermined number of second POIs from the first in the order in which the Euclidean distance from the first feature vector increases, it is possible to more accurately calculate the popularity score of the first POI.

The score calculating unit 13 may estimate the popularity score of the first POI based on the first feature vector of the first POI using a popularity estimation model which is constructed by machine learning using training data including input data including at least the second feature vectors of the second POIs and a correct answer label including the popularity scores of the second POIs.

FIG. 7 is a diagram schematically illustrating a process of training a popularity estimation model md2. As illustrated in FIG. 7, the popularity estimation model md2 is a model including a neural network which is constructed by machine learning based on training data with the second feature vectors v2 or the like indicating the geographical features of the second POIs of which the popularity scores are known as input data (feature values) and with the popularity scores sc2 of the second POIs as a correct answer label.

The popularity estimation model md2 which is a model including a trained neural network can be understood as a program which is read or referred to by a computer, which causes the computer to perform predetermined processes, and which causes the computer to realize predetermined functions.

That is, the popularity estimation model md2 in this embodiment is used by a computer including a CPU and a memory. Specifically, the CPU of the computer operates such that operational calculation based on a trained weighting factor and a response function corresponding to each layer or the like is performed on input data (such as a feature vector indicating geographical features of a POI) input to an input layer of the neural network in accordance with an instruction from the popularity estimation model md2 stored and trained in the memory, and a result (an amount of load and an amount of generated electric power) is output from an output layer.

The neural network included in the popularity estimation model md2 may be, for example, a feedforward neural network or a convolutional neural network, and the type of a neural network which is used is not particularly limited.

Input data of training data which is used to train the popularity estimation model md2 may include predetermined attribute information of the second POIs. The predetermined attribute information is, for example, population, the number of facilities in a particular category, or a distance to a nearest station.

In this case, the score calculating unit 13 inputs the first feature vector of the first POI and the predetermined attribute information on the first POI to the popularity estimation model md2 and estimates the popularity score of the first POI.

Since the popularity score of the first POI is calculated using the popularity estimation model md2 constructed in this way, it is possible to estimate the popularity score of the first POI in which geographical similarity to the second POIs is appropriately reflected. When an input feature value to the popularity estimation model md2 includes predetermined attribute information of a POI, it is possible to estimate the popularity score of the first POI in which similarity in attributes in addition to the geographical similarity to the second POIs is reflected.

Referring back to FIG. 1, the output unit 14 outputs the calculated popularity score of the first POI. Specifically, the output unit 14 stores the calculated popularity score, for example, in the field of popularity score of the POI information of the first POI illustrated in FIG. 3(b).

A process of giving a popularity score given to a group to which a POI belongs to POIs belonging to the group will be described below with reference to FIGS. 8 and 9.

In this example, the acquisition unit 11 sets a particular point which belongs to a second group included in the same category as a first group to which a first POI belongs and different from the first group and of which a popularity score is known as a second POI and acquires a map image including the second POI as a second map image.

FIG. 8 is a diagram illustrating an example of a configuration of POI information stored in the POI information storage unit 20 and data included therein, the POI information including POI information of POIs belonging to a particular group. FIG. 8(a) is a diagram illustrating an example of POI information of stores (second POIs) in Store A of which a popularity score is known, which belongs to Store B (a second group) included in the same category (a category of stores) as Store A (a first group) and different from Store A. FIG. 8(b) is a diagram illustrating an example of POI information of stores (first POIs) in Store A to which a popularity score is to be given. Similarly to the POI information illustrated in FIG. 3, the POI information illustrated in FIG. 8 includes position information, average population (daytime population), a distance to a nearest station, a category ID, a prefectural code, the number of nearby POIs, and a popularity score which are correlated with each POI name for identifying a POI.

The acquisition unit 11 acquires map images of the stores (C1 to C3 shops) in Store A as second map images based on the position information of the stores with reference to the map image storage unit 30. The acquisition unit 11 acquires map images of the stores (D1 to D3 shops) in Store B as first map images based on the position information of the stores with reference to map image storage unit 30. The generation unit 12 generates a second feature vector and a first feature vector by inputting the second map images and the first map images to the geographical feature generation model md1.

The score calculating unit 13 constructs the popularity estimation model md2 by the same machine learning as in generating a model described above with reference to FIG. 7 using training data (supervised data) with a feature vector of geographical features of the stores in Store A as input data and with popularity scores of the stores in Store A as a correct answer label. The score calculating unit 13 acquires popularity scores of the stores (the right column in FIG. 8(b)), which are obtained by inputting the first feature vector indicating the geographical features of the stores in Store B to the popularity estimation model md2 constructed using information on Store A as supervised data, as first popularity scores of the stores.

The output unit 14 divides a group popularity score indicating the popularity of the first group and given to the first group to a plurality of first POIs included in the first group based on the first popularity scores given to the first POIs and outputs the divided scores as second popularity scores of the first POIs.

FIG. 9 is a diagram illustrating an example in which the second popularity scores are calculated based on the first popularity scores and the second popularity scores of the stores in Store B are calculated.

As illustrated in the popularity score sc81 of the stores in Store B, the score calculating unit 13 calculates first popularity scores (500, 50, 10, . . . ) of the stores (D1 shop, D2 shop, D3 shop, . . . ) in Store B.

Since the first popularity score is estimated using the popularity estimation model md2 constructed using the geographical features and the popularity scores of the stores in Store A, a relationship between the geographical features and the popularity scores of the stores in Store A is reflected in the first popularity score. That is, for example, when the popularity scores of the stores in Store A are high, the first popularity scores of the stores in Store B having geographical features similar to those of the stores are also high.

When the sum of the first popularity scores calculated for the stores in Store B is "25000" and the popularity score scB given to the whole group of Store B is "5000," the output unit 14 divides the popularity score "5000" of Store B based on the first popularity scores (500, 50, 100, . . . ) of the stores (D1 shop, D2 shop, D3 shop, . . . ) in Store B, and outputs the divided popularity scores as the second popularity scores (100, 1, 2, . . . ) of the stores (D1 shop, D2 shop, D3 shop, . . . ) in Store B. For example, the second popularity score (100) of the D1 shop in Store B is calculated by the following expression.

Popularity score 5000 of Store B×(first popularity score 500 of D1 shop/sum of first popularity scores 25000 of all stores in Store B)

In this way, a popularity estimation model is constructed using feature vectors indicating geographical features of the stores in Store A included in the same category of Store B and popularity scores thereof as training data, and a group popularity score given to Store B is divided to the stores in Store B based on the first popularity scores of the stores in Store B acquired using the constructed popularity estimation model. Accordingly, it is possible to appropriately give the group popularity score given to the group to the stores.

Figure 10:
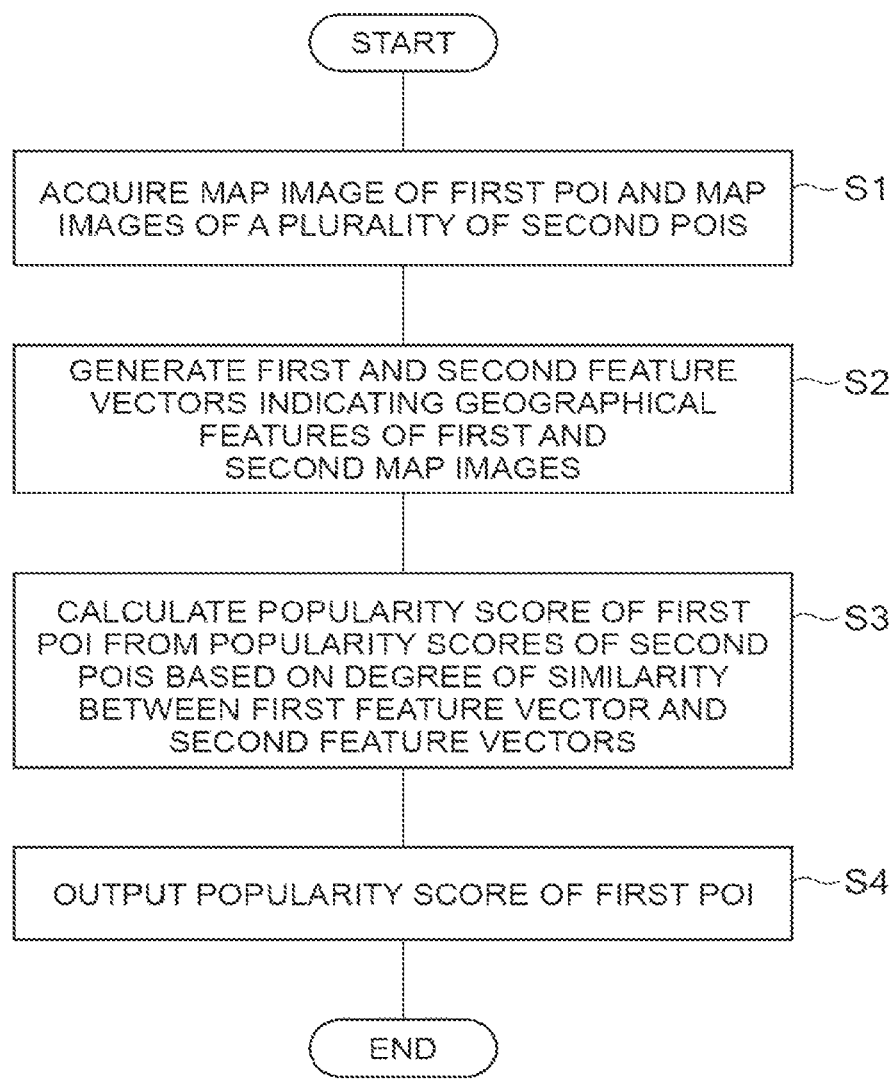
FIG. 10 is a flowchart illustrating process details of a popularity estimation method in the popularity estimation device.

FIG. 10 is a flowchart illustrating process details of a popularity estimation method in the popularity estimation device 10.

In Step S1, the acquisition unit 11 acquires a first map image including a first PO1 which is a PO1 of which a popularity score is to be estimated. The acquisition unit 11 also acquires a plurality of second map images including a second POI of which the popularity score is known.

In Step S2, the generation unit 12 generates a first feature vector and second feature vectors by inputting the first map image and the second map images to a trained geographical feature generation model md1.

In Step S3, the score calculating unit 13 calculates a popularity score of the first POI from the popularity score of the second POI based on a degree of similarity between the first feature vector and each of the plurality of second feature vectors.

In Step S4, the output unit 14 outputs the popularity score of the first POI.

Figure 11:
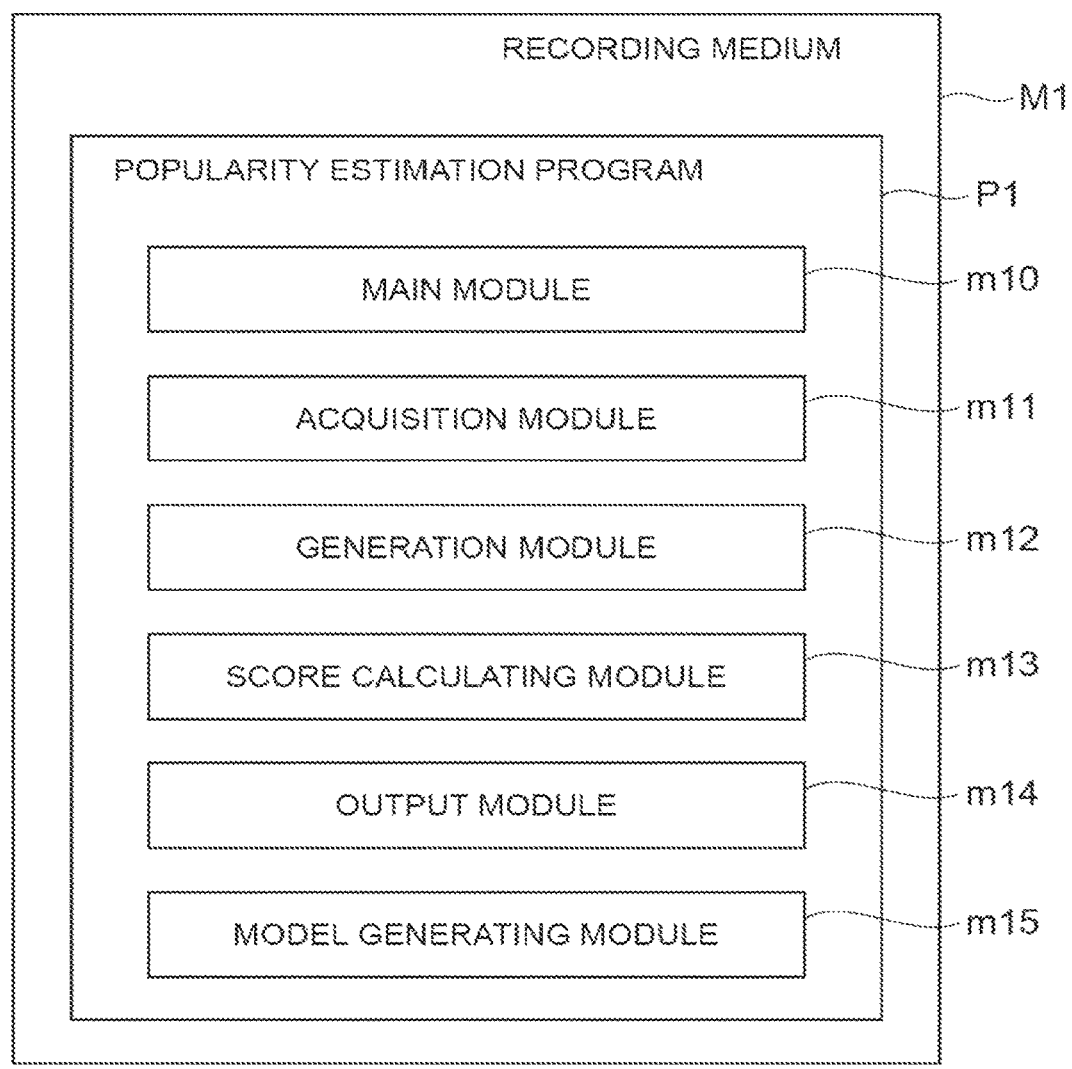
FIG. 11 is a diagram illustrating a configuration of a popularity estimation program.

A popularity estimation program for causing a computer to serve as the popularity estimation device 10 according to this embodiment will be described below. FIG. 11 is a diagram illustrating a configuration of the popularity estimation program The popularity estimation program P1 includes a main module m10 that comprehensively controls a popularity estimation process in the popularity estimation device 10, an acquisition module m11, a generation module m12, a score calculating module m13, an output module m14, and a model generating module m15. The functions of the acquisition unit 11, the generation unit 12, the score calculating unit 13, the output unit 14, and the model generating unit 15 are realized by the modules m11 to m15.

The popularity estimation program P1 may be transmitted via a transmission medium such as a communication line or may be stored in a recording medium M1 as illustrated in FIG. 11.

With the popularity estimation device 10, the popularity estimation method, and the popularity estimation program P1 according to this embodiment described above, a first feature vector is acquired by inputting a first map image including a first particular point to a geographical feature generation model. The first feature vector indicates geographical features of the first particular point. A second feature vector is acquired by inputting a second map image including a second particular point of which a popularity score is known to the geographical feature generation model. The second feature vector indicates geographical features of the second particular point. Since the popularity score of the first particular point is calculated from the known popularity score of the second particular point based on a degree of similarity between the first feature vector and the second feature vector, it is possible to obtain the popularity score of the first particular point in which geographical similarity to the second particular point is appropriately reflected.

In a popularity estimation system according to another aspect, the score calculating unit may calculate the popularity score of the first particular point from the popularity score of the second particular point based on an Euclidean distance between the first feature vector and a plurality of second feature vectors.

Geographical similarity between particular points is reflected in the Euclidean distance between feature vectors. Accordingly, according to this aspect, since the popularity score of the first particular point is calculated based on the Euclidean distance between the first feature vector and the plurality of second feature vectors, it is possible to estimate the popularity score of the first particular point in which the geographical similarity to the second particular point is appropriately reflected.

In a popularity estimation system according to another aspect, the score calculating unit may extract a predetermined number of second particular points in the order in which the Euclidean distance between the second feature vector of each second particular point and the first feature vector increases out of the plurality of second particular points and calculate the popularity score of the first particular point based on the popularity scores of the extracted second particular points and the Euclidean distances.

According to this aspect, since the popularity score of the first particular point is calculated based on the popularity scores of the predetermined number of second particular points in the order in which the Euclidean distance to the first feature vector increases, the popularity scores of the second particular points with higher geographical similarity to the first particular point are used to calculate the popularity score of the first particular point. Accordingly, it is possible to more accurately estimate the popularity score of the first particular point.

In a popularity estimation system according to another aspect, the score calculating unit may estimate the popularity score of the first particular point based on the first feature vector of the first particular point using a popularity estimation model which is constructed by machine learning using training data including input data including at least the second feature vector of the second particular point and a correct answer label including the popularity score of the second particular point.

According to this aspect, since the popularity score of the first particular point is calculated using the popularity estimation model which is constructed by machine learning using training data including pairs of the second feature vector of the second particular point and the popularity score of the second particular point, it is possible to estimate the popularity score of the first particular point in which the geographical similarity to the second particular point is appropriately reflected.

In a popularity estimation system according to another aspect, the input data of the training data used to train the popularity estimation model may include predetermined attribute information on the second particular point, and the score calculating unit may estimate the popularity score of the first particular point by inputting the first feature vector of the first particular point and the predetermined attribute information of the first particular point to the popularity estimation model.

According to this aspect, it is possible to estimate the popularity score of the first particular point in which similarity in attribute in addition to geographical similarity to the second particular point is reflected.

In a popularity estimation system according to another aspect, the acquisition unit may set a particular point which belongs to a second group included in the same category as a first group to which the first particular point belongs and different from the first group and of which the popularity score is known as the second particular point and acquire a map image including the second particular point as the second map image. The score calculating unit may acquire the popularity score estimated based on the first feature vector of the first particular point as a first popularity score using a popularity estimation model which is constructed by machine learning using training data including input data including the second feature vector based on the second map image acquired by the acquisition unit and a correct answer label including the popularity score of each second particular point. The output unit may output scores, which are obtained by dividing a known group popularity score given to the first group and indicating popularity of the first group to a plurality of the first particular points included in the first group based on the first popularity score of each first particular point, as second popularity scores of the first particular points.

According to this aspect, a popularity estimation model in which a relationship between a feature vector and a popularity score in a category to which the first group and the second group belong is appropriately reflected is used. Since the group popularity score given to the first group to which the first particular points belong is divided to the first particular points based on the first popularity score acquired using the popularity estimation model, it is possible to appropriately give the popularity score given to the group to which the particular points belong to the particular points.

The popularity estimation system according to another aspect may further include a model generating unit configured to generate a geographical feature generation model which has been trained by machine learning with a map image as an input and with a feature vector indicating geographical features of the map image as an output and including a neural network. The model generating unit may include; a training data acquiring unit configured to acquire anchor training data including a map image of a first area, positive-example training data including a map image of a second area with an attribute value of which a difference from a predetermined attribute value of the first area is equal to or less than a predetermined value, and negative-example training data including a map image of a third area with an attribute value of which a difference from the predetermined attribute value of the first area is greater than the predetermined value; a vector generating unit configured to generate an anchor feature vector, a positive-example feature vector, and a negative-example feature vector by inputting the anchor training data, the positive-example training data, and the negative-example training data to the geographical feature generation model; and a model training unit configured to adjust parameters of the neural network such that a difference between the anchor feature vector and the positive-example feature vector approaches zero and a difference between the anchor feature vector and the negative-example feature vector increases.

According to this aspect, positive-example training data including a map image of a second area with high similarity in geographical features to the first area and a negative-example training data including a map image of a third area with low similarity in geographical features to the first area are acquired. An anchor feature vector, a positive-example feature vector, and a negative-example feature vector are acquired by inputting the anchor training data, the positive-example training data, and the negative-example training data to the geographical feature generation model, and the parameters of the neural network are adjusted such that the difference between the anchor feature vector and the positive-example feature vector approaches zero and the difference between the anchor feature vector and the negative-example feature vector increases. Accordingly, it is possible to obtain a geographical feature generation model that outputs a feature vector in which a degree of similarity in geographical features is appropriately reflected.

In the popularity estimation system according to another aspect, a geographical feature generation model may cause a computer to serve to receive a map image of a particular point which is geographically identified as an input and to output a feature vector indicating geographical features of the map image, includes a neural network, and that has been trained, and the geographical feature generation model may be constructed by generating an anchor feature vector, a positive-example feature vector, and a negative-example feature vector by inputting anchor training data including a map image of a first area, positive-example training data including a map image of a second area with an attribute value of which a difference from a predetermined attribute value of the first area is equal to or less than a predetermined value, and negative-example training data including a map image of a third area with an attribute value of which a difference from the predetermined attribute value of the first area is greater than the predetermined value to the geographical feature generation model, and adjusting parameters of the neural network by machine learning such that a difference between the anchor feature vector and the positive-example feature vector approaches zero and a difference between the anchor feature vector and the negative-example feature vector increases.

According to this aspect, it is possible to obtain a geographical feature generation model that outputs a feature vector in which a degree of similarity in geographical features is appropriately reflected.

While an embodiment of the present disclosure has been described above in detail, it will be apparent to those skilled in the art that the present disclosure is not limited to the embodiments described in the present disclosure. The embodiment of the present disclosure can be altered and modified in various forms without departing from the gist and scope of the present disclosure defined by description in the appended claims. Accordingly, the description in this specification is for exemplary explanation and does not have any restrictive meaning for the present disclosure.

The aspects/embodiments described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-Wide Band), Bluetooth (registered trademark), or another appropriate system and a next-generation system which is extended based thereon.

The order of the processing steps, the sequences, the flowcharts, and the like of the aspects/embodiments described above in the present disclosure may be changed unless conflictions arise. For example, in the methods described in the present disclosure, various steps are described as elements of the exemplary order, but the methods are not limited to the described order.

Information or the like which is input or output may be stored in a specific place (for example, a memory) or may be managed using a management table. Information or the like which is input or output may be overwritten, updated, or added. Information or the like which is output may be deleted. Information or the like which is input may be transmitted to another device.

Determination may be performed using a value (0 or 1) which is expressed in one bit, may be performed using a Boolean value (true or false), or may be performed by comparison of numerical values (for example, comparison with a predetermined value).

The aspects/embodiments described in the present disclosure may be used alone, may be used in combination, or may be switched during implementation thereof. Notifying of predetermined information (for example, notifying that "it is X") is not limited to explicit notification, and may be performed by implicit notification (for example, notifying of the predetermined information is not performed).

While the present disclosure has been described above in detail, it will be apparent to those skilled in the art that the present disclosure is not limited to the embodiments described in the present disclosure. The present disclosure can be altered and modified in various forms without departing from the gist and scope of the present disclosure defined by description in the appended claims. Accordingly, the description in the present disclosure is for exemplary explanation and does not have any restrictive meaning for the present disclosure.

Regardless of whether it is called software, firmware, middleware, microcode, hardware description language, or another name, software should be widely construed to refer to a command, a command set, a code, a code segment, a program code, a program, a sub program, a software module, an application, a software application, a software package, a routine, a sub routine, an object, an executable file, an execution thread, a sequence, a function, or the like.

Software, a command, and the like may be transmitted and received via a transmission medium. For example, when software is transmitted from a web site, a server, or another remote source using wired technology such as a coaxial cable, an optical fiber cable, a twisted-pair wire, or a digital subscriber line (DSL) and/or wireless technology such as infrared rays or microwaves, the at least one of wired technology and/or wireless technology is included in the definition of the transmission medium.

Information, signals, and the like described in the present disclosure may be expressed using one of various different techniques. For example, data, an instruction, a command, information, a signal, a bit, a symbol, and a chip which can be mentioned in the overall description may be expressed by a voltage, a current, an electromagnetic wave, a magnetic field or magnetic particles, a photo field or photons, or an arbitrary combination thereof.

Terms described in the present disclosure and/or terms required for understanding the present disclosure may be substituted with terms having the same or similar meanings.

The terms "system" and "network" used in the present disclosure are compatibly used.

Information, parameters, and the like described above in the present disclosure may be expressed as absolute values, may be expressed as values relative to predetermined values, or may be expressed using other corresponding information.

The term "determining" or "determination" used in the present disclosure may include various types of operations. The term "determining" or "determination" may include cases in which judging, calculating, computing, processing, deriving, investigating, looking up, search, or inquiry (for example, looking up in a table, a database, or another data structure), and ascertaining are considered to be "determined." The term "determining" or "determination" may include cases in which receiving (for example, receiving information), transmitting (for example, transmitting information), input, output, and accessing (for example, accessing data in a memory) are considered to be "determined." The term "determining" or "determination" may include cases in which resolving, selecting, choosing, establishing, comparing, and the like are considered to be "determined." That is, the term "determining" or "determination" can include cases in which a certain operation is considered to be "determined." "Determining" may be replaced with "assuming," "expecting," "considering," or the like.

The expression "based on" used in the present disclosure does not mean "based on only" unless otherwise described. In other words, the expression "based on" means both "based on only" and "based on at least."

No reference to elements named with "first," "second," or the like used in the present disclosure generally limit amounts or order of the elements. These naming can be used in the present disclosure as a convenient method for distinguishing two or more elements. Accordingly, reference to first and second elements does not mean that only two elements are employed or that a first element precedes a second element in any form.

When the terms "include" and "including" and modifications thereof are used in this specification or the appended claims, the terms are intended to have a comprehensive meaning similar to the term "comprising." The term "or" used in this specification or the claims is not intended to mean an exclusive logical sum.

In this specification, two or more of any devices may be included unless the context or technical constraints dictate that only one device is included.

In the entire present disclosure, singular terms include plural referents unless the context or technical constraints dictate that a unit is singular.

REFERENCE SIGNS LIST

1 . . . Popularity estimation system, 10 . . . Popularity estimation device, 11 . . . Acquisition unit, 12 . . . Generation unit, 13 . . . Score calculating unit, 14 . . . Output unit, 15 . . . Model generating unit, 20 . . . POI information storage unit, 30 . . . Map image storage unit, 40 . . . Geographical feature generation model storage unit, 50 . . . Popularity estimation model storage unit, 151 . . . Training data acquiring unit, 152 . . . Vector generating unit, 153 . . . Model training unit, M1 . . . Recording medium, m10 . . . Main module, m11 . . . Acquisition module, m12 . . . Generation module, m13 . . . Score calculating module, m14 . . . Output module, m15 . . . Model generating module, P1 . . . Popularity estimation program

The invention claimed is:

1. A popularity estimation system that estimates the popularity of a particular point which is geographically identified, the popularity estimation system comprising circuitry configured to:
   acquire a first map image including a first particular point which is a particular point to be estimated and to acquire a plurality of second map images including a second particular point which is a particular point of which a popularity score indicating popularity is known;
   generate a first feature vector and a second feature vector indicating geographical features of the first map image and the second map images by inputting the first map image and the second map images to a geographical feature generation model which has been trained by machine learning with a map image as an input and with a feature vector indicating geographical features of the map image as an output;
   calculate a popularity score of the first particular point from a popularity score of the second particular point based on a degree of similarity between the first feature vector and the second feature vector; and
   output the calculated popularity score of the first particular point,
   wherein the circuitry is further configured to
   generate a geographical feature generation model with a map image of a particular point as an input and with a feature vector indicating geographical features of the map image as an output and including a neural network,
   acquire, for generating the geographical feature generation model, anchor training data including a map image of a first area, positive-example training data including a map image of a second area with an attribute value of which a difference from a predetermined attribute value of the first area is equal to or less than a predetermined value, and negative-example training data including a map image of a third area with an attribute value of which a difference from the predetermined attribute value of the first area is greater than the predetermined value,
   generate, for generating the geographical feature generation model, an anchor feature vector, a positive-example feature vector, and a negative-example feature vector by inputting the anchor training data, the positive-example training data, and the negative-example training data to the geographical feature generation model, and
   adjust, for generating the geographical feature generation model, parameters of the neural network such that a difference between the anchor feature vector and the positive-example feature vector approaches zero and a difference between the anchor feature vector and the negative-example feature vector increases.

2. The popularity estimation system according to claim 1, wherein the circuitry calculates the popularity score of the first particular point from the popularity score of the second particular point based on an Euclidean distance between the first feature vector and a plurality of the second feature vectors.

3. The popularity estimation system according to claim 2, wherein the circuitry extracts a predetermined number of second particular points in the order in which the Euclidean distance between the second feature vector of each second particular point and the first feature vector increases out of the plurality of second particular points and calculates the popularity score of the first particular point based on the popularity scores of the extracted second particular points and the Euclidean distances.

4. The popularity estimation system according to claim 1, wherein the circuitry estimates the popularity score of the first particular point based on the first feature vector of the first particular point using a popularity estimation model which is constructed by machine learning using training data including input data including at least the second feature vector of the second particular point and a correct answer label including the popularity score of the second particular point.

5. The popularity estimation system according to claim 4, wherein the input data of the training data used to train the popularity estimation model includes predetermined attribute information on the second particular point, and
   wherein the circuitry estimates the popularity score of the first particular point by inputting the first feature vector of the first particular point and the predetermined attribute information of the first particular point to the popularity estimation model.

6. The popularity estimation system according to claim 1, wherein the circuitry sets a particular point which belongs to a second group included in the same category as a first group to which the first particular point belongs and different from the first group and of which the popularity score is known as the second particular point and acquires a map image including the second particular point as the second map image,
   wherein the circuitry acquires the popularity score estimated based on the first feature vector of the first particular point as a first popularity score using a popularity estimation model which is constructed by machine learning using training data including input data including the second feature vector based on the second map image acquired by the circuitry and a correct answer label including the popularity score of each second particular point, and
   wherein the circuitry outputs scores obtained by dividing a known group popularity score given to the first group and indicating popularity of the first group to a plurality of the first particular points included in the first group based on the first popularity score of each first particular point as second popularity scores of the first particular points.

7. A method, implemented by circuitry of a popularity estimation system that estimates the popularity of a particular point which is geographically identified, the method comprising:
   acquiring a first map image including a first particular point which is a particular point to be estimated and to acquire a plurality of second map images including a second particular point which is a particular point of which a popularity score indicating popularity is known;
   generating a first feature vector and a second feature vector indicating geographical features of the first map image and the second map images by inputting the first map image and the second map images to a geographical feature generation model which has been trained by machine learning with a map image as an input and with a feature vector indicating geographical features of the map image as an output;
   calculating a popularity score of the first particular point from a popularity score of the second particular point based on a degree of similarity between the first feature vector and the second feature vector; and outputting the calculated popularity score of the first particular point, wherein the method further includes:

generating a geographical feature generation model with a map image of a particular point as an input and with a feature vector indicating geographical features of the map image as an output and including a neural network, acquiring, for generating the geographical feature generation model, anchor training data including a map image of a first area, positive-example training data including a map image of a second area with an attribute value of which a difference from a predetermined attribute value of the first area is equal to or less than a predetermined value, and negative-example training data including a map image of a third area with an attribute value of which a difference from the predetermined attribute value of the first area is greater than the predetermined value, generating, for generating the geographical feature generation model, an anchor feature vector, a positive-example feature vector, and a negative-example feature vector by inputting the anchor training data, the positive-example training data, and the negative-example training data to the geographical feature generation model, and adjusting, for generating the geographical feature generation model, parameters of the neural network such that a difference between the anchor feature vector and the positive-example feature vector approaches zero and a difference between the anchor feature vector and the negative-example feature vector increases.

* * * * *